(12) United States Patent
Kim

(10) Patent No.: US 10,036,444 B2
(45) Date of Patent: Jul. 31, 2018

(54) DAMPING FORCE CONTROLLING SHOCK ABSORBER

(71) Applicant: MANDO CORPORATION, Pyeongtaek-si, Gyeoggi-do (KR)

(72) Inventor: Eun Joong Kim, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 14/738,683

(22) Filed: Jun. 12, 2015

(65) Prior Publication Data
US 2015/0362038 A1    Dec. 17, 2015

(30) Foreign Application Priority Data
Jun. 12, 2014   (KR) .................. 10-2014-0071482

(51) Int. Cl.
| F16F 9/512 | (2006.01) |
|---|---|
| F16F 9/348 | (2006.01) |
| F16F 9/46 | (2006.01) |

(52) U.S. Cl.
CPC .......... *F16F 9/3488* (2013.01); *F16F 9/465* (2013.01); *F16F 9/466* (2013.01)

(58) Field of Classification Search
CPC .... F16F 9/512; F16F 9/348; F16F 9/18; F16F 9/465; F16F 9/466; F16F 9/46; F16F 9/3488
See application file for complete search history.

(56) References Cited

U.S. PATENT DOCUMENTS

| 6,474,454 B2 * | 11/2002 | Matsumoto ........... F16F 9/3484 188/282.6 |
| 6,860,370 B2 * | 3/2005 | Nakadate .............. F16F 9/3485 188/282.5 |
| 7,997,394 B2 * | 8/2011 | Yamaguchi ............. F16F 9/465 188/266.2 |
| 2003/0098209 A1 | 5/2003 | Nakadate |

FOREIGN PATENT DOCUMENTS

| JP | 2002-295566 A | 10/2002 |
| KR | 10-2003-0044814 A | 6/2003 |
| KR | 10-0854598 B1 | 8/2008 |

OTHER PUBLICATIONS

Korean Office Action issued in Korean Application No. 10-2014-0071482, dated Jun. 10, 2015.
Chinese Office Action dated Jan. 3, 2017 issued in Chinese Patent Application No. 201510325058.8 (with English translation).

* cited by examiner

*Primary Examiner* — Xuan Lan T Nguyen
(74) *Attorney, Agent, or Firm* — McDermott Will & Emery LLP

(57) ABSTRACT

A damping force controlling shock absorber can generate a hard damping force through disk slits during a low speed operation by adding a disk valve to a chamber, can constantly maintain a pressure of a back pressure compartment by opening a disk valve and discharge the pressure of the back pressure compartment to the outside when the pressure of the back pressure compartment is at a predetermined level or more, thereby generating a harder damping force during a low speed operation, and can adjust a disk valve open pressure during a medium/high speed operation so as to prevent the durability of the equipment from being lowered by an excessive increase of a pressure and prevent an abnormal operation from occurring.

7 Claims, 4 Drawing Sheets

DAMPING FORCE CONTROLLING SHOCK ABSORBER

CROSS-REFERENCE(S) TO RELATED APPLICATION

This application claims priority of Korean Patent Application No. 10-2014-0071482, filed on Jun. 12, 2014, in the Korean Intellectual Property Office, which is hereby incorporated by reference in its entirety.

BACKGROUND OF THE INVENTION

Field of the Invention

The present invention relates to a damping force controlling shock absorber, and more particularly, to a damping force controlling shock absorber that is capable of generating a hard damping force when the shock absorber operates at a low speed and controlling an excessive increase of a damping force by preventing a pressure of a back pressure compartment from exceeding a predetermined level even in a driving situation when the shock absorber operates at a medium/high speed.

Description of the Related Art

In general, a shock absorber is installed in means of transportation, such as automobile or the like, and improves a ride comfort by absorbing and damping a vibration or shock from a road surface during driving.

Such a shock absorber includes a cylinder and a piston rod installed to be compressible and extendable within the cylinder. The cylinder and the piston rod are installed in a vehicle body, wheels, or axles.

A shock absorber, a damping force of which is set to be low, can improve a ride comfort by absorbing a vibration caused by unevenness of a rod surface during driving.

On the contrary, a shock absorber, a damping force of which is set to be high, can improve a steering stability by suppressing a change in a posture of a vehicle body.

Therefore, there has been developed a damping force controlling shock absorber in which a damping force controlling valve capable of appropriately adjusting damping force characteristics is mounted on one side, such that the damping force characteristics are appropriately adjusted to improve a ride comfort or a steering ability according to a road surface and a driving condition.

However, if a conventional damping force controlling shock absorber increases a damping force so as to provide a hard damping force, a pressure of a back pressure chamber may exceed a set level in a medium/high speed operating situation, thus lowering the durability of the equipment.

As the prior document related to the present invention, Korean Patent Application Laid-Open No. 10-1998-0002962 (Mar. 30, 1998) discloses a damping force controlling buffer valve.

SUMMARY OF THE INVENTION

The present invention is directed to provide a damping force controlling shock absorber that can generate a hard damping force through disk slits during a low speed operation by adding a disk valve to a chamber, can constantly maintain a pressure of a back pressure compartment by opening a disk valve and discharge the pressure of the back pressure compartment to the outside when the pressure of the back pressure compartment is at a predetermined level or more, thereby generating a harder damping force during a low speed operation, and can adjust a disk valve open pressure during a medium/high speed operation so as to prevent the durability of the equipment from being lowered by an excessive increase of a pressure and prevent an abnormal operation from occurring.

According to the present invention, there is provided a damping force controlling shock absorber, which includes a piston rod configured to perform compression and rebound strokes within a cylinder, a piston connected to a lower end of the piston rod to divide the cylinder into a compression chamber and a rebound chamber, a main passage passing through the piston in a vertical direction, and a solenoid connected to the piston rod and the piston to elevate a spool by a magnetic force, the damping force controlling shock absorber including: a spool guide configured to guide the spool in a state of surrounding the outer periphery of the spool and having a hard passage and a soft passage that are connected by the movement of the spool; main valves installed in a stroke direction of the piston and connected to the soft passage to generate a damping force when the soft passage is opened; back pressure chambers connected in a stroke direction of the main valves and connected to the main passage and the hard passage to generate a damping force when the hard passage is opened; outlet ports formed in a stroke direction of the back pressure chambers to connect back pressure compartments of the back pressure chambers to the compression chamber and the rebound chamber; and a discharge valve installed in a state of blocking the outlet ports from a direction of the compression chamber and the rebound chamber and configured to be opened when a pressure of the back pressure compartment exceeds a set level.

The main valve may include: a pair of retainers installed in a stroke direction of the piston and having a first passage in a central portion so as to be connected to the main passage, and a second passage formed in an edge portion so as to be connected to the back pressure compartment of the back pressure chamber; a pair of first main disks installed in a stroke direction of the retainers and configured to come into close contact with central portions of the retainers to generate a damping force to the first passage; and second main disks installed in a stroke direction of the first main disks and configured to come into close contact with edge portions of the retainers to generate a damping force to the second passage.

The damping force controlling shock absorber may further include one or more slits in edge portions of the second main disks, wherein the one or more slits allow a fluid transferred from the back pressure compartment of the back pressure chamber to move through the second passage to the main passage.

The hard passages may be formed at positions of the retainers and the back pressure chambers and configured to connect the first passage, a hollow of the spool guide, and the back pressure compartments when opened, and the soft passage may be formed to share a position of the piston and the hard passage and configured to connect the first passage and the main passage when opened.

The discharge valve may include: one or more first discharge disks installed in a state of blocking the outlet port from a direction of the compression chamber and the rebound direction, edge portions of the one or more first discharge disks being opened when the pressure of the back pressure compartment exceeds a set level; and second discharge disks configured to support the one or more first discharge disks in a direction of the back pressure chambers and bring the one or more first discharge disks into close contact with the back pressure chamber.

DETAILED DESCRIPTION OF EXEMPLARY EMBODIMENTS

Hereinafter, exemplary embodiments of the present invention will be described in detail with reference to the accompanying drawings.

The advantages and features of the present invention and methods for achieving them will become more apparent from the following embodiments that are described in detail in conjunction with the accompanying drawings.

However, the present invention is not limited to the following embodiments and may be embodied in various forms. These embodiments are provided so that this disclosure will be thorough and complete, and will fully convey the scope of the invention to those skilled in the art. The scope of the present invention is defined by the appended claims.

In addition, detailed descriptions of well-known technologies or the like will be omitted since they would unnecessarily obscure the subject matters of the present invention.

Figure 1:
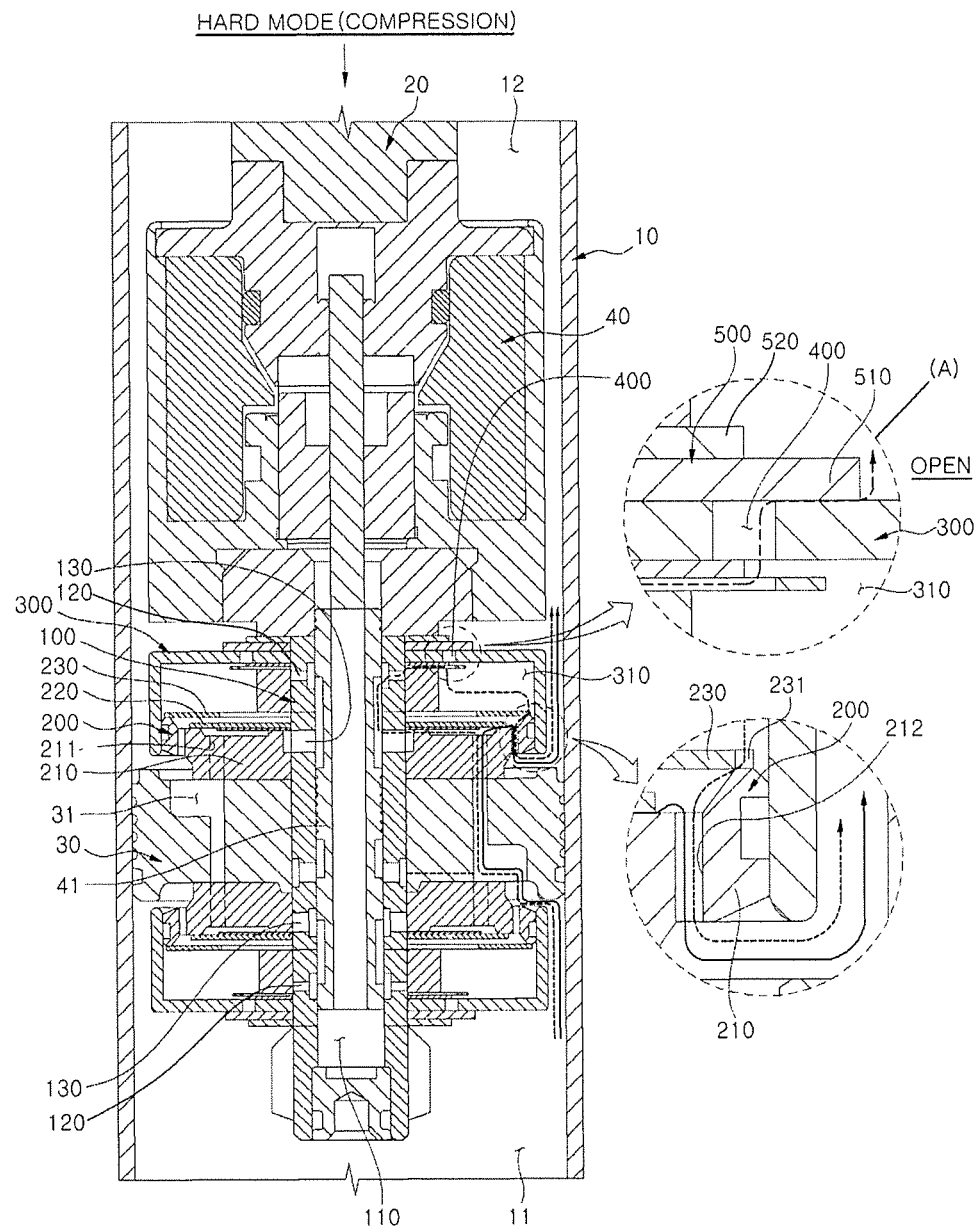
FIG. 1 is a front cross-sectional view illustrating a state in which a discharge valve is opened when an internal pressure of a back pressure chamber is at a set level or more in a hard mode compression stroke state of a damping force controlling shock absorber according to the present invention.

FIG. 1 is a front cross-sectional view illustrating a state in which a discharge valve is opened (A) when an internal pressure of a back pressure chamber is at a set level or more in a hard mode compression stroke state of a damping force controlling shock absorber according to the present invention.

Figure 2:
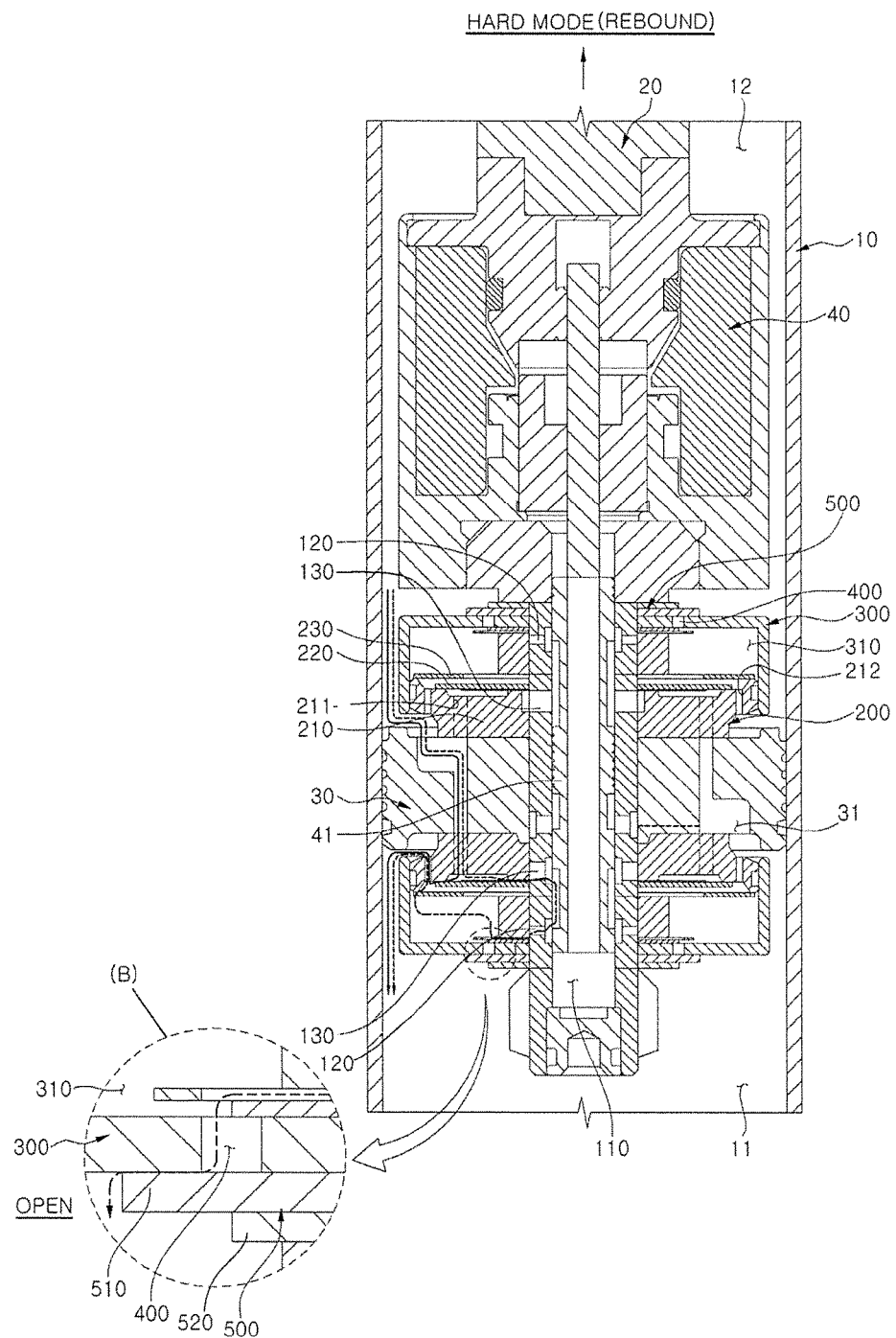
FIG. 2 is a front cross-sectional view illustrating a state in which the discharge valve is opened when the internal pressure of the back pressure chamber is at the set level or more in a hard mode rebound stroke state of the damping force controlling shock absorber according to the present invention.

FIG. 2 is a front cross-sectional view illustrating a state in which the discharge valve is opened (B) when the internal pressure of the back pressure chamber is at the set level or more in a hard mode rebound stroke state of the damping force controlling shock absorber according to the present invention.

Figure 3:
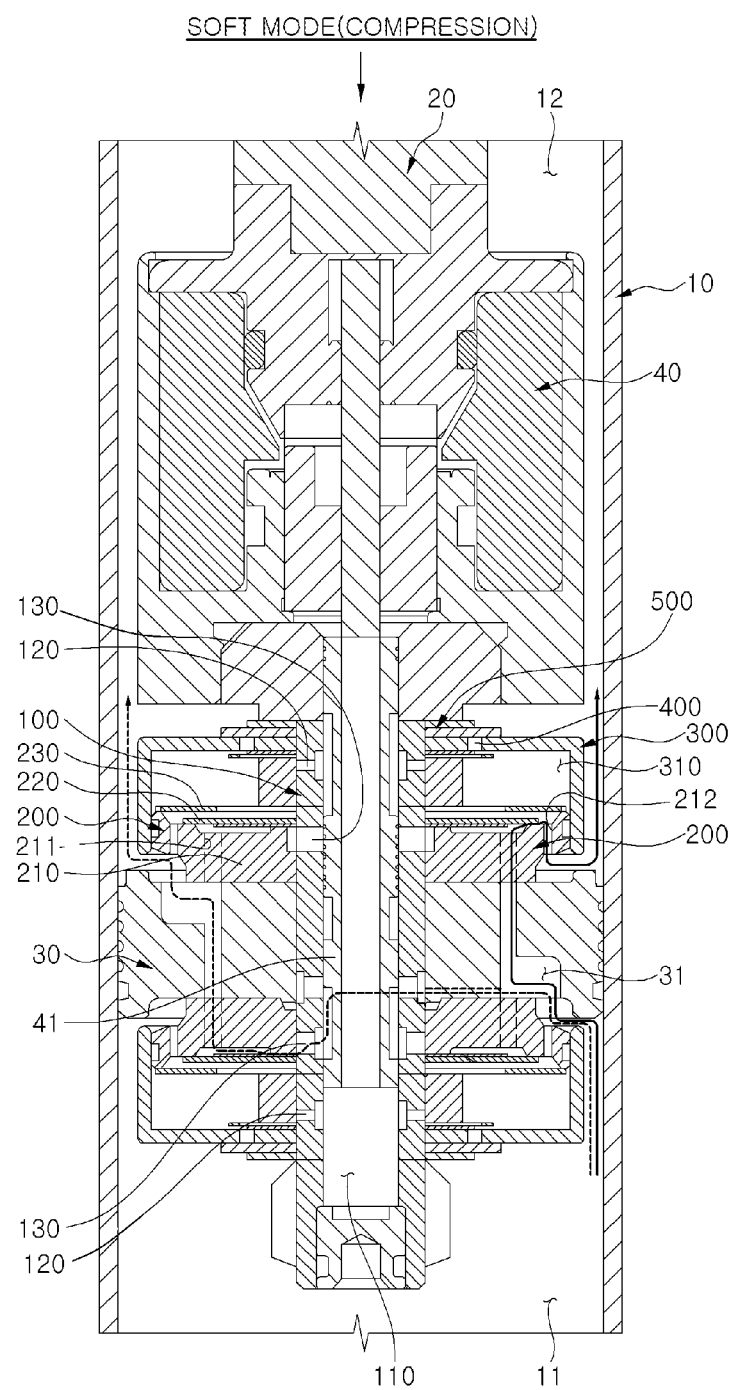
FIG. 3 is a front cross-sectional view illustrating a soft mode compression stroke state of the damping force controlling shock absorber according to the present invention.
Figure 4:
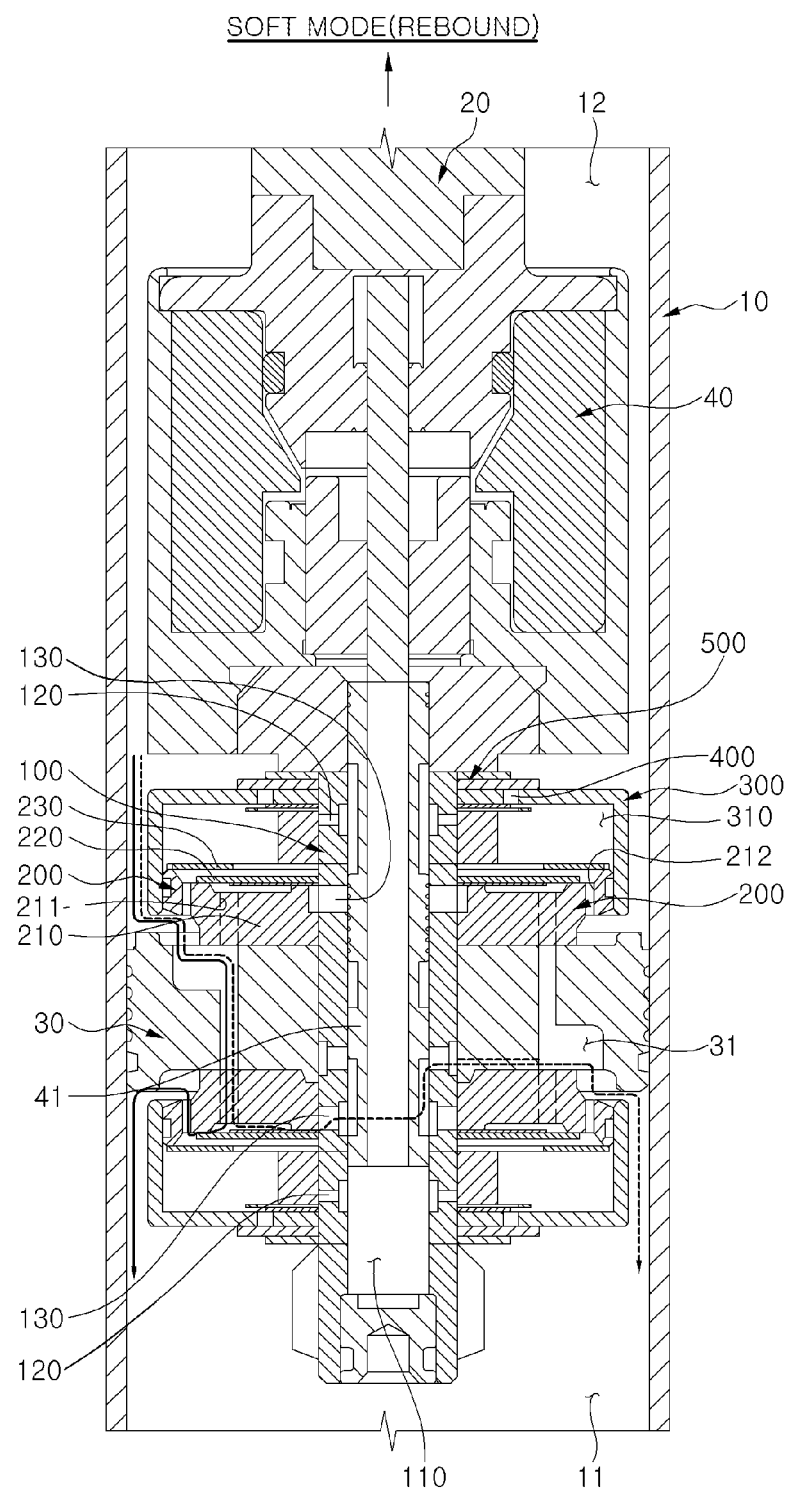
FIG. 4 is a front cross-sectional view illustrating a soft mode rebound stroke state of the damping force controlling shock absorber according to the present invention.

FIG. 3 is a front cross-sectional view illustrating a soft mode compression stroke state of the damping force controlling shock absorber according to the present invention. FIG. 4 is a front cross-sectional view illustrating a soft mode rebound stroke state of the damping force controlling shock absorber according to the present invention.

As illustrated in FIGS. 1 to 4, the damping force controlling shock absorber according to the present invention includes a cylinder 10, a piston rod 20, a piston valve, and a solenoid.

In particular, the damping force controlling shock absorber according to the present invention includes a spool guide 100, a main valve 200, a back pressure chamber 300, an outlet port 400, and a discharge valve 500.

Of the above-described elements, the cylinder 10 may have a cylindrical shape to form a space inside, and the cylinder 10 is filled with a fluid (oil or the like).

The cylinder 10 may be divided into an inner tube (not illustrated) and an outer tube (not illustrated). A body valve (not illustrated) may be further installed in a lower portion of the inner tube.

A storeroom (not illustrated), which is defined by the body valve, may be formed between the inner tube and the outer tube.

That is, the damping force controlling shock absorber according to the present invention may be applied to both a single cylinder and a dual cylinder 10.

In addition, the inside of the cylinder 10 may be divided into a compression chamber 11 and a rebound chamber 12 by a piston valve to be described below.

In addition, a separate coupling portion (not illustrated) for connection to a vehicle body side or a wheel side may be installed in a lower end of the cylinder 10.

One end of the cylinder 10 and one end of the piston rod 20 may perform compression and rebound strokes in a state of being respectively connected to the vehicle body side or the wheel side of the vehicle.

One end of the piston rod 20 is connected to the piston valve, and the other end of the piston rod 20 extends outward from the outer tube and is connected to the vehicle body side or the wheel side of the vehicle.

The piston 30 divides the inside of the cylinder 10 into the compression chamber 11 and the rebound chamber 12. A main passage 31 passes through the piston 30 in a vertical direction.

A solenoid valve 40 elevates a spool in a state of being connected to the piston rod 20 disposed inside the cylinder 10 and selectively opens and closes a hard passage 120 and a soft passage 130 to be described below.

To this end, the solenoid valve 40 may include an operating chamber in which a plunger is elevatably installed, and a coil wound around the outside of the operating chamber.

The coil forms a magnetic force by using external power and elevates the spool 41 in a soft mode or a hard mode.

The spool guide 100 is vertically installed inside the cylinder 10 and vertically guides the spool 41 in a state of surrounding the outer periphery of the spool 41.

A hollow 110 is formed inside the spool guide 100 such that the spool 41 is vertically movable.

The hard passage 120 and the soft passage 130 are formed in the spool guide 100 such that the hard passage 120 and the soft passage 130 are selectively opened or closed by the elevation of the spool 41.

The hard passage 120 is formed to penetrate horizontally. A pair of hard passages 120 is formed corresponding to the upper and lower portions of the spool guide 100.

That is, the hard passages 120 may be respectively formed at positions of retainers 210 and the back pressure chamber 300 to be described below.

In a case where the spool 41 moves unidirectionally as illustrated in FIGS. 1 and 2, the hard passages 120 are respectively connected to a first passage 211, the hollow of the spool guide 100, and the back pressure chamber 300 as described below.

The soft passage 130 is formed to penetrate horizontally. The soft passage 130 may be located between the hard passages 120.

At this time, the soft passage 130 is formed to share the position of the piston 30 and the hard passage 120 located in a direction of the compression chamber 11.

The soft passage 130 connects the first passage 211 and the main passage 31 of the piston when the spool 41 moves upward as illustrated in FIGS. 3 and 4.

That is, in a case where the hard passage 120 is opened, the fluid may generate a hard damping force while moving through the main passage 31 and the back pressure chamber 300 to the compression chamber 11 or the rebound chamber 12.

On the other hand, in a case where the soft passage 130 is opened, the fluid may generate a soft damping force while moving through the main passage 31 to the compression chamber 11 or the rebound chamber 12.

The main valve 200 is installed in a stroke direction of the piston 30 and generates a damping force due to a resistance of the fluid during the compression and rebound strokes of the piston 30.

In a case where the soft passage 130 is opened, the main valve is connected to the main passage 31 and the soft passage 130 to generate a damping force.

To this end, the main valve 200 may include a pair of retainers 210, a pair of first main disks 220, and a pair of second main disks 230.

The retainers 210 may be installed in a stroke direction of the piston 30 and may have a first passage 211 formed in the central portions thereof so as to be connected to the main passage 31.

The retainers 210 may have a second passage 212 formed in the peripheries thereof so as to be connected to the back pressure compartment 310 of the back pressure chamber 300.

The first main disks 220 may have a disk shape with a hollow so as to be connected to the spool guide 100, and the first main disks 220 are installed in a stroke direction of the retainers 210.

The first main disks 220 come into close contact with the central portions of the retainers 210 and generate a damping force to the first passage 211.

The centers of the first main disks 220 may be connected on the spool guide 100, and one or more first main disks 220 may be connected in a stacked manner.

The second main disks 230 may have a disk shape with a hollow so as to be connected to the spool guide 100, and the second main disks 230 are installed in a stroke direction of the first main disks 220.

The second main disks 230 come into close contact with the edge portions of the retainers 210 and generate a damping force to the second passage 212.

As illustrated in FIG. 1, one or more slits 231 are formed to penetrate vertically at the edge portions of the second main disks 230.

The slits 231 allow the fluid transferred from the back pressure compartment 310 of the back pressure chamber 300 to move through the second passage 212 to the main passage 31.

The back pressure chamber 300 is connected in a stroke direction of the main valves 200. When the hard passage 120 is opened, the back pressure chamber 300 is connected to the main passage 31 and the hard passage 120 and generates a damping force.

At this time, the fluid, which moves to the back pressure compartment 310 of the back pressure chamber 300 through the hard passage 120, generates a hard damping force while moving to the compression chamber 11 or the rebound chamber 12 through the slits 231 of the second main disks 230 and the second passage 212.

The outlet port 400 is formed in a stroke direction of the back pressure chambers 300 and connects the back pressure compartments 310 of the back pressure chambers 300 to the compression chamber 11 and the rebound chamber 12.

As illustrated in FIGS. 1 and 2, the discharge valve 500 is installed in a state of blocking the outlet port 400 from a direction of the compression chamber 11 and the rebound chamber 12, and the discharge valve 500 is opened (A) (B) when the pressure of the back pressure compartment 310 is at a set level or more.

To this end, the discharge valve 500 may be provided with a first discharge disk 510 and a second discharge disk 520.

The first discharge disk 510 may have a disk shape with a hollow so as to be connected to the spool guide 100, and the first discharge disk 510 is installed in a state of blocking the outlet port 400 from a direction of the compression chamber 11 and the rebound chamber 12.

When the pressure of the back pressure compartment 310 is at the set level or more, the edge portion of the first discharge disk 510 is spaced apart from the back pressure chamber 300 and the fluid is discharged to the compression chamber 11 or the rebound chamber 12.

The second discharge disk 520 may have a disk shape with a hollow so as to be connected to the spool guide 100, and the second discharge disk 520 supports the first discharge disk 510 in a direction of the back pressure chambers 300.

Meanwhile, the discharge pressure of the back pressure compartment 310 can be controlled by adjusting the shape and the number of the second discharge disks 520 and the first discharge disks 510.

Hereinafter, the operation of the damping force controlling shock absorber according to the present invention will be described with reference to FIGS. 1 to 4.

First, in a case where the solenoid is operated in the hard mode and then the compression and rebound strokes are performed, the fluid of the compression chamber 11 or the rebound chamber 12 moves to the main passage 31 of the piston 30 and the first passage 211 of the main valve 200 as illustrated in FIGS. 1 and 2.

At this time, the fluid, which moves to the first passage 211, moves through the second passage 212 to the rebound chamber 12 while pushing the first main disk 220 and generates a main damping force.

At the same time, the fluid of the compression chamber 11 moves to the back pressure compartment 310 through the main passage 31 of the piston 30 and the hard passage 120 of the first passage 211.

Then, the fluid, which moves to the back pressure compartment 310, generates a hard damping force while moving to the compression chamber 11 or the rebound chamber 12 through the slits 231 of the second main disks 230 and the second passage 212.

When the internal pressure of the back pressure compartment 310 is at a set level or more, the discharge valve 500 is opened (A) (B) as illustrated in FIGS. 1 and 2.

At this time, the pressure of the back pressure compartment 310 may return to the set level by the pressure discharge of the discharge valve 500. When the pressure of the back pressure chamber 300 returns to the set level, the discharge valve 500 changes to a blocking state.

Meanwhile, in a case where the discharge valve 500 is opened (A) (B) as illustrated in FIGS. 1 and 2, the second passage 212 can be blocked if the second main disk 230 comes into close contact with the retainer 210.

On the other hand, in a case where the solenoid is operated in the soft mode and then the compression stroke is performed, the fluid of the compression chamber 11 moves to the main passage 31 of the piston 30 and the first passage 211 of the main valve 200 as illustrated in FIG. 3.

At this time, the fluid, which moves to the first passage 211, moves through the second passage 212 to the rebound chamber 12 while pushing the first main disk 220 and generates a main damping force.

At the same time, the fluid of the compression chamber 11 generates a soft damping force while moving to the rebound chamber 12 through the soft passage 130, the first passage 211, and the main passage 31.

On the other hand, in a case where the solenoid is operated in the soft mode and then the rebound stroke is performed, the fluid of the rebound chamber 12 moves to the main passage 31 of the piston 30 and the first passage 211 of the main valve 200 as illustrated in FIG. 4.

At this time, the fluid, which moves to the first passage 211, moves through the second passage 212 to the compression chamber 11 while pushing the first main disk 220 and generates a main damping force.

At the same time, the fluid, which moves to the first passage 211, generates a soft damping force while moving to the compression chamber 11 through the soft passage 130.

As a result, according to the present invention, the first main disk 220 and the second main disk 230 are installed in the back pressure chamber 300 to generate a hard damping force. When the pressure of the back pressure compartment 310 is at a predetermined level or more, the pressure of the back pressure compartment 310 can be maintained at the set level by opening the discharge valve 500.

Therefore, according to the present invention, it is possible to generates a harder damping force during a low speed operation. In addition, by adjusting a disk valve open pressure during a medium/high speed operation, it is possible to preventing the durability of the equipment from being lowered by an excessive increase of a pressure and prevent an abnormal operation from occurring.

According to the present invention, the hard damping force is generated through the disk slit during the low speed operation by adding the disk valve to the chamber. When the pressure of the back pressure chamber is at the predetermined level or more, the pressure of the back pressure chamber is constantly maintained by opening the disk valve to discharge the pressure of the back pressure chamber to the outside, thereby generating a harder damping force during the low speed operation.

In addition, according to the present invention, the disk valve open pressure is adjusted during the medium/high speed operation so as to prevent the durability of the equipment from being lowered by an excessive increase of a pressure and prevent an abnormal operation from occurring.

The damping force controlling shock absorbers according to specific embodiments of the present invention have been described, but it is obvious that various modifications can be made without departing from the scope of the present invention.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

| | |
|---|---|
| 10: cylinder | 11: compression chamber |
| 12: rebound chamber | 20: piston rod |
| 30: piston | 31: main passage |
| 40: solenoid valve | 41: spool |
| 100: spool guide | 110: hollow |
| 120: hard passage | 130: soft passage |
| 200: main valve | 210: retainer |
| 211: first passage | 212: second passage |
| 220: first main disk | 230: second main disk |
| 231: slit | 300: back pressure chamber |
| 310: back pressure compartment | 400: outlet port |
| 500: discharge valve | 510: first discharge disk |
| 520: second discharge disk | |

What is claimed is:

1. A damping force controlling shock absorber, which includes a piston rod configured to perform compression and rebound strokes within a cylinder, a piston connected to a lower end of the piston rod to divide the cylinder into a compression chamber and a rebound chamber, a main passage passing through the piston in a vertical direction, and a solenoid connected to the piston rod and the piston to elevate a spool by a magnetic force, the damping force controlling shock absorber comprising:
a spool guide configured to guide the spool in a state of surrounding the outer periphery of the spool and having a plurality of hard passages and a plurality of soft passages at upper and lower portions of the spool guide, the plurality of hard passages and the plurality of soft passages connected by movement of the spool;
a main valve installed in a stroke direction of the piston and connected to the plurality of soft passages to generate a damping force when the plurality of soft passages are opened;
a back pressure chamber connected in a stroke direction of the main valve and connected to the main passage and the plurality of hard passages to generate a damping force when the plurality of hard passages are opened;
an outlet port formed in a stroke direction of the back pressure chamber to connect a back pressure compartment of the back pressure chamber to the compression chamber and the rebound chamber; and
a discharge valve installed in a state of blocking the outlet port from a direction of the compression chamber and the rebound chamber and configured to be opened when a pressure of the back pressure compartment exceeds a set level,
wherein when the spool moves downward away from the piston rod during the rebound stroke, the plurality of hard passages and the plurality of soft passages communicate with each other through a groove formed on an outer surface of the spool,
wherein when the spool moves upward toward the piston rod during the compression stroke, the communication between the plurality of hard passages and the plurality of soft passages is blocked,
wherein the main valve comprises:
a retainer installed in a stroke direction of the piston;
a first main disk disposed on an upper portion of the retainer at a lower end of the back pressure chamber; and
a second main disk disposed above the first main disk at the lower end of the back pressure chamber and having one or more slits in an edge portion thereof, and wherein the discharge valve comprises:
a first discharge disk disposed at an upper end of the back pressure chamber in a state of blocking the outlet port from a direction of the compression chamber and the rebound direction;
a second discharge disk configured to support the first discharge disk in a direction of the back pressure chamber, and
wherein the upper end of the back pressure chamber is another end of the back pressure chamber toward the piston rod and the lower end of the back pressure chamber is one end of the back pressure chamber.

2. The damping force controlling shock absorber according to claim 1,
wherein the retainer has a first passage in a central portion so as to be connected to the main passage, and a second passage formed in an edge portion so as to be connected to the back pressure compartment of the back pressure chamber,
the first main disk is in a close contact with a central portion of the retainer to generate a damping force to the first passage, and
the second main disk is in a close contact with an edge portion of the retainer to generate a damping force to the second passage.

3. The damping force controlling shock absorber according to claim 2,
wherein the one or more slits allow a fluid transferred from the back pressure compartment to move through the second passage to the rebound chamber.

4. The damping force controlling shock absorber according to claim 2, wherein the plurality of hard passages are formed at a position of the retainer and the back pressure chamber and configured to connect the first passage, a hollow of the spool guide, and the back pressure compartment when opened, and
the plurality of soft passages are formed in the spool guide to communicate with the plurality of hard passages and configured to connect the first passage and the main passage when opened.

5. The damping force controlling shock absorber according to claim 1,
wherein an edge portion of the first discharge disk is opened when the pressure of the back pressure compartment exceeds a set level, and
the second discharge disk brings the first discharge disk into close contact with the back pressure chamber.

6. The damping force controlling shock absorber according to claim 1, wherein each of the discharge valve, the main valve, the back pressure chamber, the back pressure compartment, and the outlet port are provided in plural.

7. The damping force controlling shock absorber according to claim 3, wherein the fluid, which moves to the back pressure compartment through the plurality of hard passages, moves to the compression chamber or the rebound chamber through the one or more slits and the second passage.

* * * * *